(12) United States Patent
Fafard et al.

(10) Patent No.: US 12,524,936 B1
(45) Date of Patent: Jan. 13, 2026

(54) CIRCUIT BOARD IMAGE ANALYSIS

(71) Applicant: Two Six Labs, LLC, Arlington, VA (US)

(72) Inventors: Alexander Fafard, Rochester, NY (US); Austin Fletcher, Keego Harbor, MI (US)

(73) Assignee: Two Six Labs, LLC, Arlington, VA (US)

( * ) Notice: Subject to any disclaimer, the term of this patent is extended or adjusted under 35 U.S.C. 154(b) by 224 days.

(21) Appl. No.: 18/231,959

(22) Filed: Aug. 9, 2023

(51) Int. Cl.
*G06T 11/20* (2006.01)
*G06T 7/00* (2017.01)

(52) U.S. Cl.
CPC .......... *G06T 11/206* (2013.01); *G06T 7/0004* (2013.01); *G06T 2207/30141* (2013.01)

(58) Field of Classification Search
CPC ..... G06T 11/206; G06T 7/0004; G06T 7/001; G06T 2207/30141; G06T 3/14; G06T 9/40; G06T 2207/20081; G06T 2207/20072
See application file for complete search history.

(56) References Cited

U.S. PATENT DOCUMENTS

| | | | | |
|---|---|---|---|---|
| 6,112,407 A | * | 9/2000 | Hagner | H05K 3/041 |
| | | | | 174/262 |
| 6,507,670 B1 | * | 1/2003 | Moed | G06T 5/77 |
| | | | | 382/172 |
| 2002/0170027 A1 | * | 11/2002 | Teig | G06F 30/392 |
| | | | | 716/122 |
| 2014/0270480 A1 | * | 9/2014 | Boardman | G06T 17/00 |
| | | | | 382/154 |
| 2018/0067996 A1 | * | 3/2018 | Virshup | G06F 16/248 |
| 2023/0125477 A1 | * | 4/2023 | Gurumurthy | G06N 3/08 |
| | | | | 382/103 |

OTHER PUBLICATIONS

Lakshman Naika R, Dinesh R, and Prabhanjan S."Handwritten Electric Circuit Diagram Recognition: An Approach Based on Finite State Machine". International Journal of Machine Learning and Computing, vol. 9, No. 3, Jun. 2019 (Year: 2019).*
Rabbani, Mahdi, et al. "Hand drawn optical circuit recognition." Procedia Computer Science 84 (2016): 41-48. (Year: 2016).*

* cited by examiner

*Primary Examiner* — Daniel F Hajnik
*Assistant Examiner* — Thomas John Foster
(74) *Attorney, Agent, or Firm* — Armis IP Law, LLC (57) ABSTRACT

A circuit analysis application receives an imaged representation of a circuit, such as a schematic, circuit board image, scan result, or other similar electronic pixelated representation capable of raster (video screen renderable) visualization. The application iterates through a sequence of extraction and classification operations, including an object or component extraction for identifying discrete components of the circuit, traces denoting connections between the components, and component identification for determining a type, and hence the electrical properties, of each component and the connections to other components. The result is a graph of circuit components and connections to other components, normalized in a form suitable for comparison to other circuit representations and stored in a database for subsequent comparison and identification with other unknown circuit forms.

16 Claims, 9 Drawing Sheets

CIRCUIT BOARD IMAGE ANALYSIS

BACKGROUND

Circuit board reverse engineering is a time consuming and imprecise task. Printed circuit boards (PCBs), schematic circuit diagrams and other specifications may be sought for origin and operation. Corporate acquisitions, forensic analysis and discarded/abandoned hardware represent potential sources of circuits that may benefit from an ability to reverse engineer and identify the circuit components and connections.

SUMMARY

A circuit analysis application depicts a system, method and apparatus for receiving an imaged representation of a circuit, such as a schematic, circuit board image, scan result, or other similar electronic pixelated representation capable of raster (video screen renderable) visualization. An application iterates through a sequence of extraction and classification operations, including an object or component extraction for identifying discrete components of the circuit, traces denoting connections between the components, and component identification for determining a type, and hence the electrical properties, of each component and the connections to other components. The result is a graph of circuit components and connections to other components, normalized in a form suitable for comparison to other circuit representations and stored in a database for subsequent comparison and identification with other unknown circuit forms.

There have been substantial developments in the field of electronics and so-called "computer vision" over the course of the last several decades; enabling many new possibilities for use. Alongside these developments have been several advancements in manufacturing automation and circuit design which have provided an ever-growing corpus of digital information. This information is collected in many forms, including digital design files, technical manuals and images of schematics. While it is possible to distill digital design files into schematics, and humans with domain expertise are able to compare and understand these representations, this is a labor intensive process. These mediums of technical information are difficult to directly compare in any autonomous fashion, and prohibit any form of meaningful computational intelligence. In conventional approaches, there has been little to no meaningful work that attempts to unify the representation of schematics in image form to an intermediate graph representation that can be compared with digital design files.

Configurations herein are based, in part, on the observation that identification of circuit boards having an unknown or incomplete origin can provide a useful mechanism for industrial development, research and forensic analysis. Existing designs and related history can become lost or compromised through corporate acquisition, records transition, and human resource turnover. Also tactical intelligence gathering acquires unknown and/or partial circuits from illegal or covert activities. Unfortunately, conventional approaches to circuit board identification are time consuming and tedious, often employing manual techniques for traversing and comparing available design specifications and reverse engineering to piece together a representation of subject circuit board.

Accordingly, configurations herein substantially overcome the shortcomings of manual circuit board deconstruction and reverse engineering by providing an application for analyzing a graphical or raster-based representation of a circuit board or schematic, and identifying circuit components, types, and interconnections between them for generating a normalized graph indicative of the subject circuit representation. Configurations disclosed below robustly capture information from an electrical schematic raster image and convert this representation to a primitive format that is easily convertible to a digital design file. Additionally, the ability to extract information from schematic images into a comparable format allows further computational capabilities with electronics, including but not limited to semantic searches, statistical comparison, component tracing and autonomous circuit generation) of electrical schematic content.

In further detail, a particular example configuration depicts a method for analyzing a circuit representation for generating a graph of interconnected components by scanning a functional rendering of a circuit for identifying a plurality of windows, each window depicting a bounding box sub-image of a respective component and a location of the respective component of a plurality of components in the circuit, scanning the functional rendering for identifying connections between the windows, and generating a graph indicative of circuit elements and traces interconnecting the circuit elements based on coalescing the plurality of windows with the identified connections.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An example of the disclosed approach for analyzing functional rendering of a circuit is presented in detail below. The input includes a visual rendering of a circuit such as a photographic image of a PCB (Printed Circuit Board) or schematic diagram capable of electronic representation on a graphical (raster) medium, and the output is a node-based graph representation in a normalized form adapted for storage, rendering and comparison with other circuit representations in the disclosed graph medium.

Figure 1:
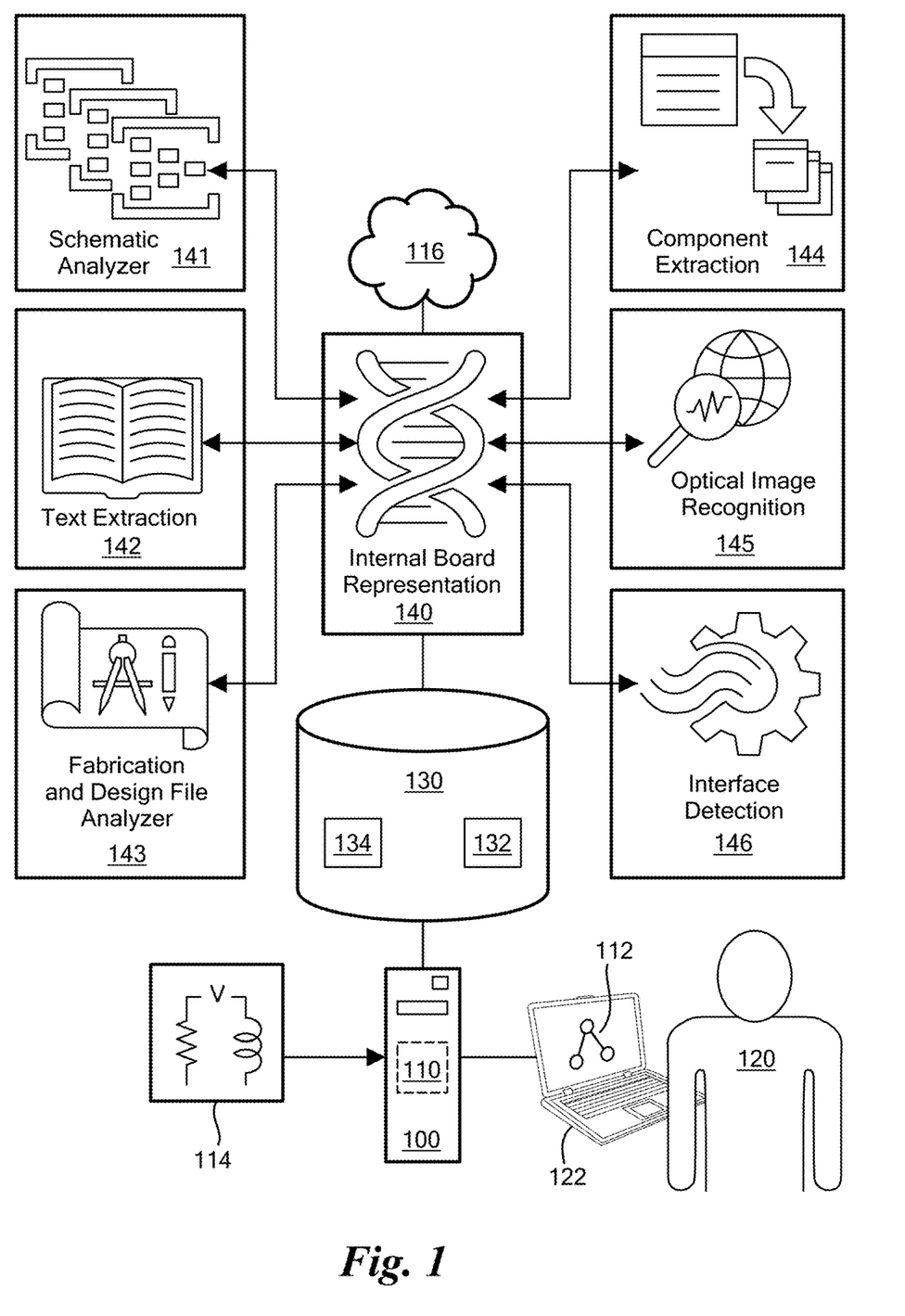
FIG. 1 is a context diagram of an analysis environment suitable for use with configurations herein.

FIG. 1 is a context diagram of an analysis environment suitable for use with configurations herein. Referring to FIG. 1, circuit analysis server 100 invokes an application 110 for a variety of tools and sources that are drawn upon for generating the renderable graph 112 of a subject input circuit 114 for analysis. A user 120 invokes the application 110 via an interactive device 122 and specifies the input circuit 114 representation in the best available form. The application 110 invokes a database 130 including a component detection model 132 and a component identification model 134, both derived from an internal board representation 140 of aggregated circuit data suitable for analytical analysis. The aggregated circuit data is collected via a schematic analyzer 141, text extraction 142, fabrication and design file analysis 143, component extraction 144, optical image recognition 145, interface detection 146 and other suitable methods and raw data available for analysis from public access networks 116 such as the Internet and other available sources. The aggregated circuit data therefore may be available from existing circuit schematic diagrams, vendor catalogs and specification sheets, PCB photographs, user/operator manuals and other available materials used to generate the models 132, 134. Collectively, the application 110 and server 100 provide the system for schematic/raster to graph 112 conversion of the subject input circuit 114 (subject circuit), suitable for rendering on the interactive device 122.

Figure 2:
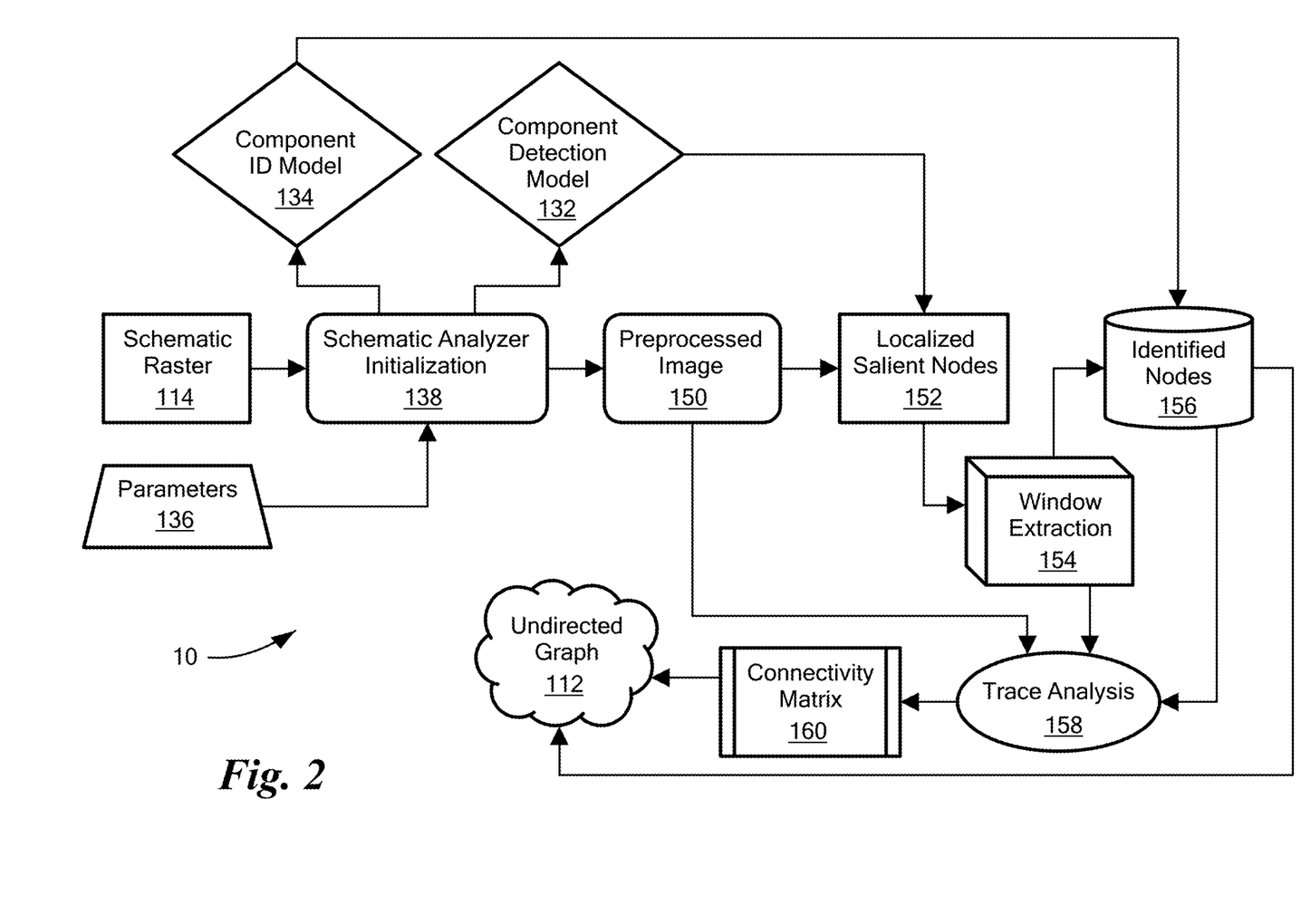
FIG. 2 is a workflow of circuit detection and analysis in the environment of FIG. 1.

FIG. 2 is a workflow of circuit detection and analysis in the environment of FIG. 1. Referring to FIGS. 1 and 2, the major steps involved in analysis and graph generation of a subject input circuit 114 are shown; subsequent figures detail each of these steps further. Referring to FIGS. 1 and 2, the subject input circuit 114 can be any suitable schematic raster form, typically a PCB photograph or schematic line drawing is presented. The application 110 scans a functional rendering of the circuit for identifying a plurality of windows, such that each window depicts a location of a respective component of a plurality of components in the circuit. A set of derived parameters 136 is invoked to initialize the system 10. This system initializes the two previously trained machine learning models 132, 134, and performs pre-processing 138 of the raster image, including changing its size and image statistics to work well with the models 132, 134.

The application 110 uses the preprocessed image 150 with the component detection model 132 to localize where salient objects indicative of components in the schematic are present, and these localizations are used to extract windows containing these objects as localized salient nodes 152, as depicted at step 154. In other words, the windows denote graphical depictions that are likely circuit components (resistor, capacitor, IC (Integrated Circuit) chip, and the like). The components are then identified with the component model 134 at step 156, which identifies, for each of the windows, a component type indicative of the component occupying the window. The component occupying the window defines a node of the resulting rendered graph 112.

The application 110 then scans the functional rendering for identifying connections between the windows. These joint pieces of information are then used along with the input circuit 114 to do a trace analysis 158 using the traces running continuously between the windows to denote connections between circuit components. The graph is generated indicative of circuit elements and traces interconnecting the circuit elements based on coalescing the plurality of windows with the identified connections. The connections result in a connectivity matrix 160, and the graph 112 is created from this connectivity matrix and the identified nodes defined by each component. This system 10 has the benefit of being highly modular such that components may be swapped out as improvements are made to the state of the art in object detection and image classification, allowing for tuning and introduction of new circuit examples in the trained models 132, 134.

Figure 3:
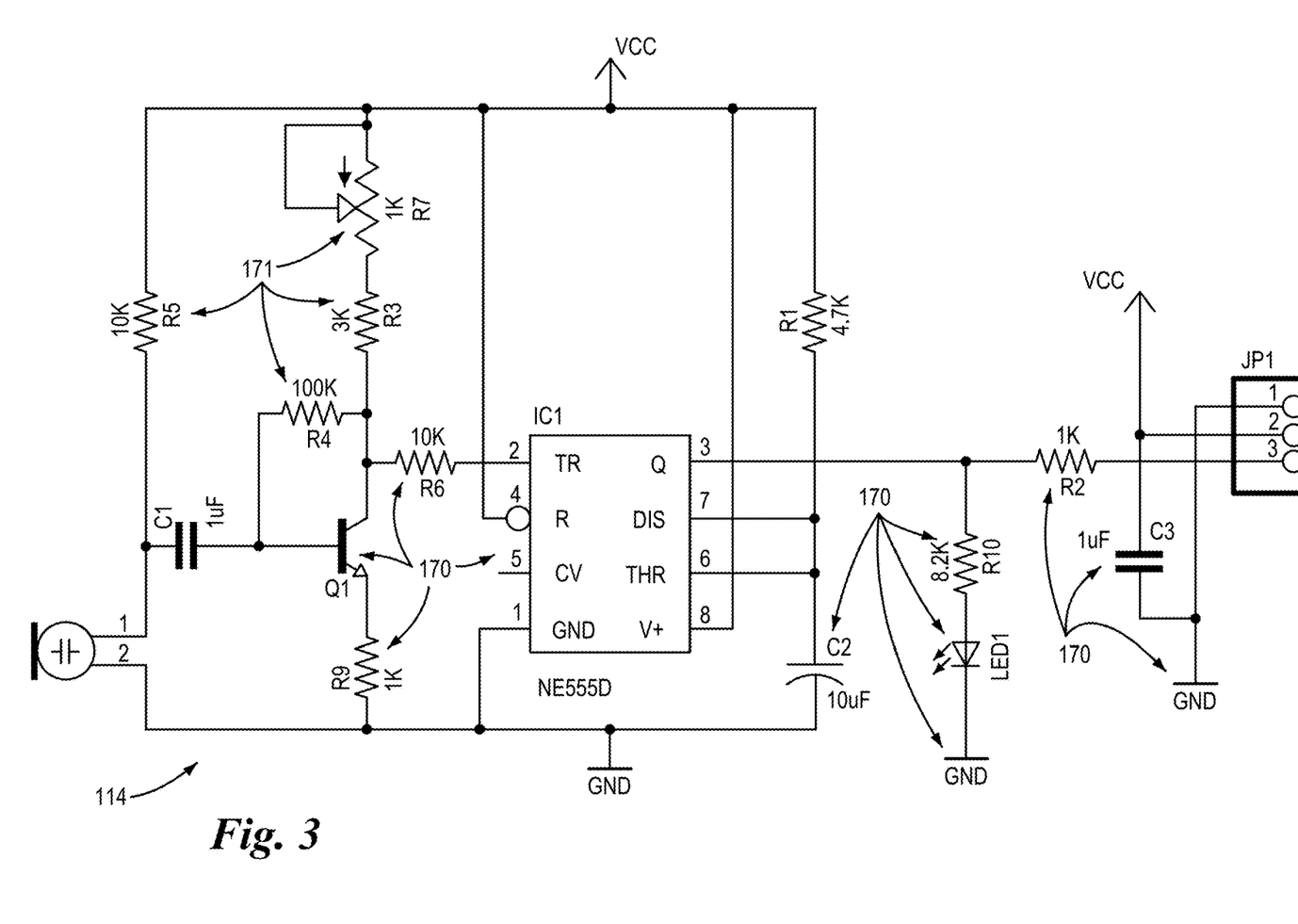
FIG. 3 is an example of a circuit for ingestion and analysis in the environment of FIG. 1.

FIG. 3 is an example of a sample input circuit for ingestion and analysis in the environment of FIG. 1. Referring to FIGS. 1-3, the input format will be recognized as a symbolic schematic line drawing, depicting circuit elements with common symbols for components 171 such as a resistor, inductor, voltage source, and a centrally located 8-pin IC chip, all denoted during image ingestion, below. The functional rendering generally includes a raster representation of an image, schematic, diagram, alphanumeric or symbolic representation of a plurality of components and at least one connection between the plurality of components 171, usually a two dimensional rendering of a PCB (printed circuit board) or a line drawn schematic, as in FIG. 3.

Figure 4:
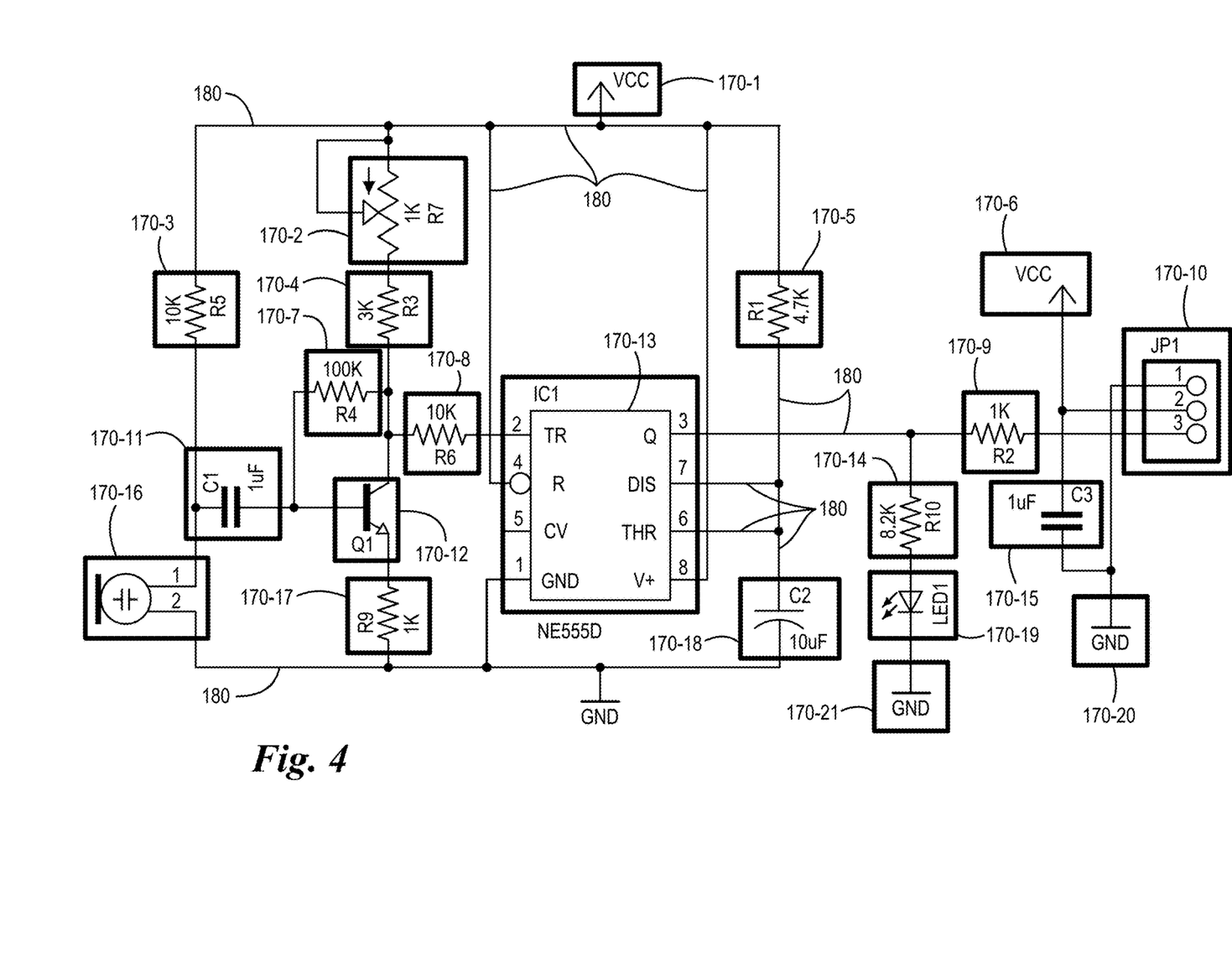
FIG. 4 shows component detection in the circuit of FIG. 3.

FIG. 4 shows component 171 detection in the circuit of FIG. 3. From the localized objects in the previous step. Image "windows" which are defined by a region of interest surrounding the part are extracted. From the graphically depicted objects of FIG. 3, the application 110 denotes a rectangular window 170-1 . . . 170-21 (170 generally) around each of the objects determined to be a circuit component 171 in FIG. 3. Each window 170 therefore denotes a two dimensional portion of the grid occupied by the circuit component. As shown in FIG. 4, the graphical depictions of the objects determined to be circuit components (from FIG. 3) are designated with a rectangular box denoting their location. Each window 170 therefore represents a node in the computed graph.

Figure 5:
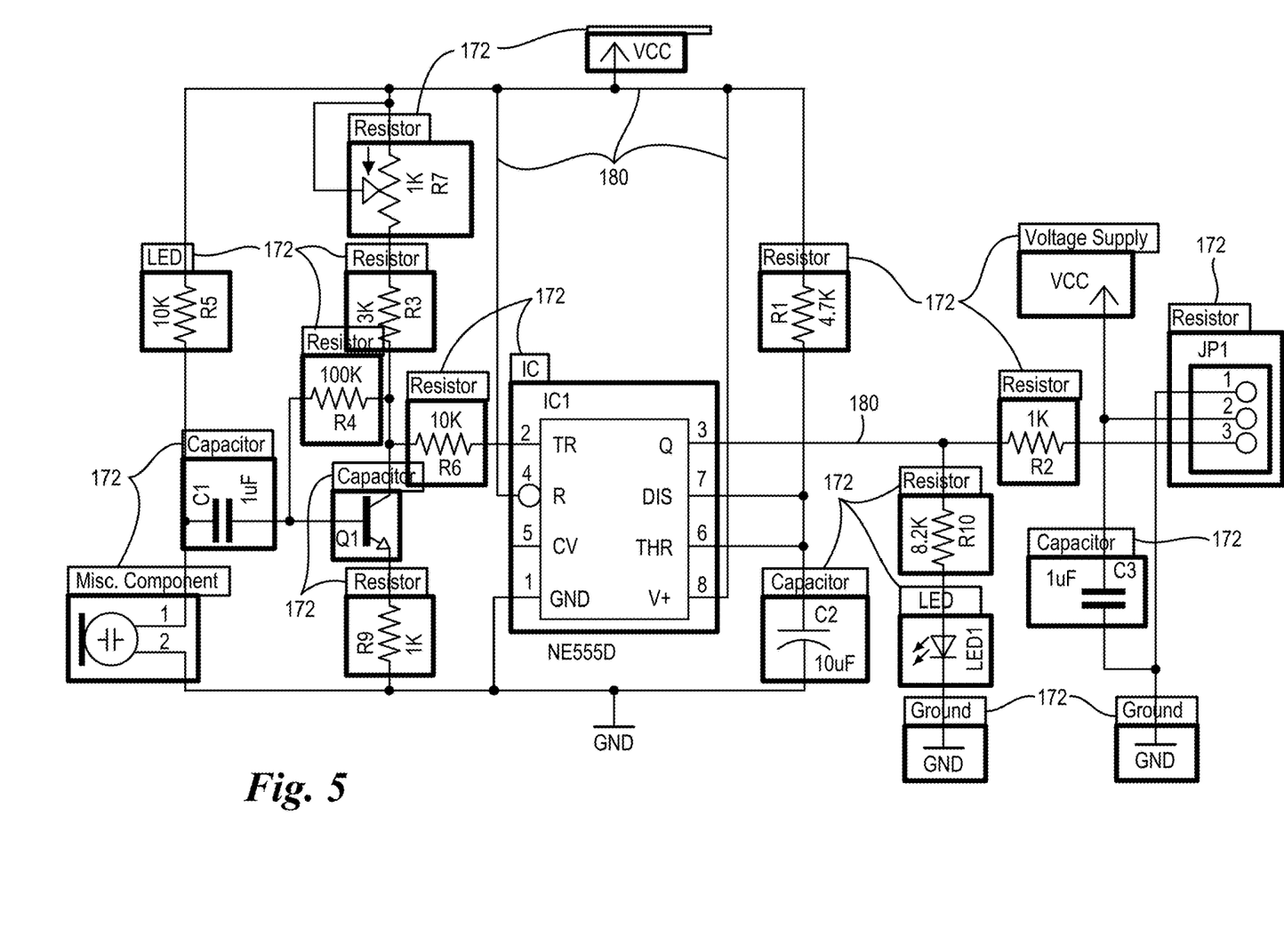
FIG. 5 shows component identification in the circuit of FIG. 3.

FIG. 5 shows component 171 identification in the circuit of FIG. 3. For each window 170, the component therein is identified by type 172, using the component identification model 134. An example list of types is shown in Table I; other suitable granularity and types of circuit component type may also be employed. The component ID model 134 is applied to the graphical contents of each window to determine the most likely match for the type of component (circuit element).

TABLE I

{0: 'AGND',
1: 'Battery',
2: 'Capacitor',
3: 'Connector Jack',
4: 'Crystal',
5: 'DGND',
6: 'Diode',
7: 'Filter',
8: 'Fuse',
9: 'Ground',
10: 'IC',
11: 'Inductor',
12: 'Jumper',
13: 'Junk', (Non-Part | Spurious Localization)
14: 'LED',
15: 'Misc. Component',
16: 'Oscillator',
17: 'Rectifier',
18: 'Relay',
19: 'Resistor',
20: 'Solar Cell',
21: 'Switch',
22: 'Test Point', TABLE I-continued 23: 'Transformer',
24: 'Transistor',
25: 'Voltage Supply'}

Figure 6:
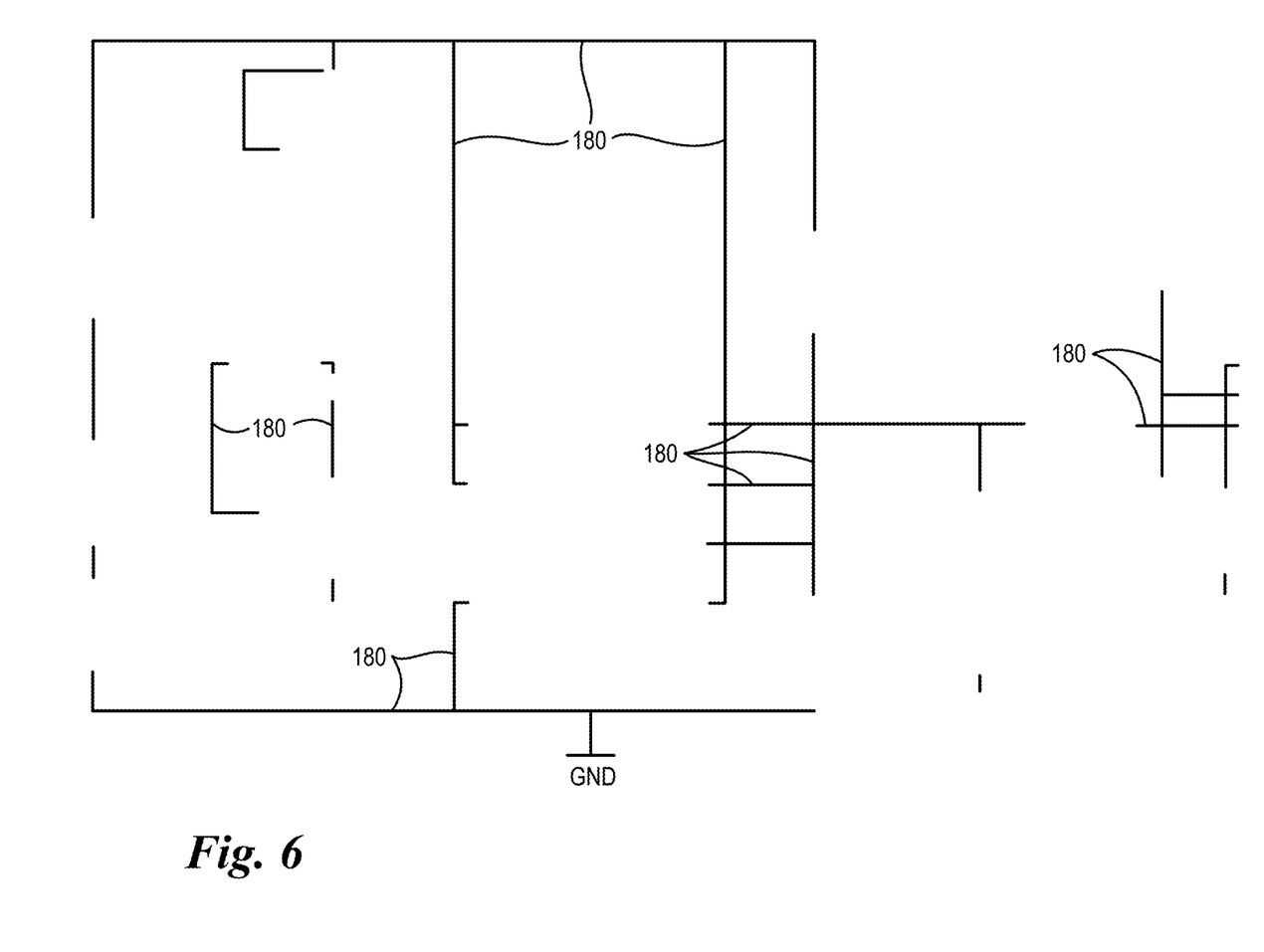
FIG. 6 shows trace identification in the circuit of FIG. 3.
Figure 7:
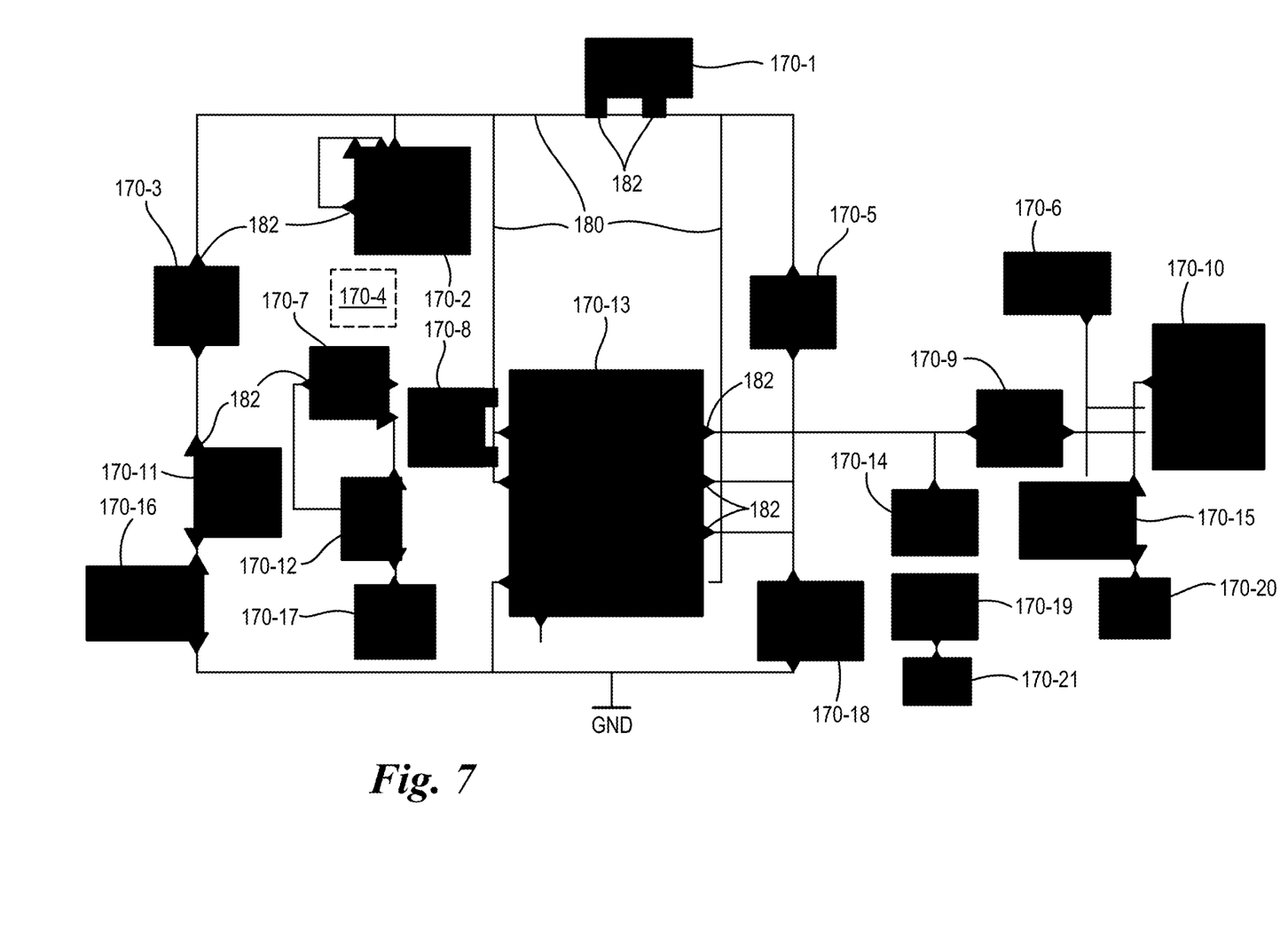
FIG. 7 shows connection identification using the components of FIG. 5 and the traces of FIG. 6.

FIG. 6 shows trace identification in the circuit of FIG. 3. From the functional rendering of FIG. 3, the circuit components are in electrical communication with each other through traces 180, each denoting a conductive path between the components, typically representing a wire, solder path or conductive strip, on a substrate on which the circuit components are deployed. The application 110 subtracts the windows 170 from the functional rendering, identifies the traces 180 in the functional rendering. A further filter or enhancement may skeletonize the binary image of would-be traces. This involves thinning the binary lines such that they only have a width of 1 pixel. which simplifies the input and reduces noise before continuing with connectivity analyses. The skeletonization step is useful for normalizing differences in input quality, especially in cases where the input rasters may have wildly different DPIs. For each trace 180, the application 110 computes connections based on a correspondence of a location of a window and a location of termination of the trace. The image 114 of the schematic diagram is again revisited-here the windows 170, each defining a respective node, are removed from the image via window subtraction. What is left behind are the traces 180 which indicate connectivity between components. These graphical representations of connections often do not form closed connections with components, thus another stage of intermediate processing is introduced which iteratively solves for the closest points between nodes and traces as an optimization problem. In other words, the trace 180 might not "touch" the component 171 to which it connects. The application 110 determines an endpoint of the connection, and computes a distance to a nearest component 171 from the endpoint. These closest paths are drawn and are shown in FIG. 7 below. The traces 180 are employed for identifying a plurality of connections, where each connection extends from a first window of the plurality of windows to at least one other window of the plurality of windows. While traces 180 form an electrical connection, and thus would generally be meaningless if not connecting two components, traces can form conductive paths between two or more components. Generally, the trace 180 represents an electrical conductivity such that all points on the trace are at the same voltage potential, and define current carrying paths between the components 171.

FIG. 7 shows connection identification using the components of FIG. 5 and the traces of FIG. 6. FIG. 7 shows determining, for each connection, a plurality of endpoints 182 corresponding to the connection, and determining, for each endpoint of the plurality of endpoints, a location of the endpoints of the connection, shown as expanded regions. With these closest paths drawn, the connectivity can be more easily evaluated from coalescing the plurality of windows with the identified connections, in effect, forming an overlay or recombination of the windows 170 of FIG. 4 with the traces 180 of FIG. 6. A further item of note is that since the matching performed by the models 132, 134 is probabilistic, every window need not be detected for proper operation; for example, the connection scanning did not pick up on window 170-4 and associated connections. Similarity can be evaluated using the gathered components and traces and compare similar circuits, even if not an exact match.

Coalescing further includes computing connectivity of a connection based on a correspondence between the location of the endpoint 182 and the location of a respective window 170. It is important that a connection to a component is not construed merely because a trace passes closely to the corresponding window. The application 110 computes a path defined by a trace 180 by identifying a closest window 170 to the path, where the window 170 is indicative of the corresponding component 171. It then traverses a plurality of directions from the path by considering the 8 surrounding pixel directions from the path. The application 110 determines if any of the plurality of directions connects to the window 170, and determines connectivity of the trace 180 based on an alignment of the path with the direction connecting to the window 170. In other words, if the window is in front of the traversal direction of the path, and not to one side of the primary trace direction.

Figure 8:
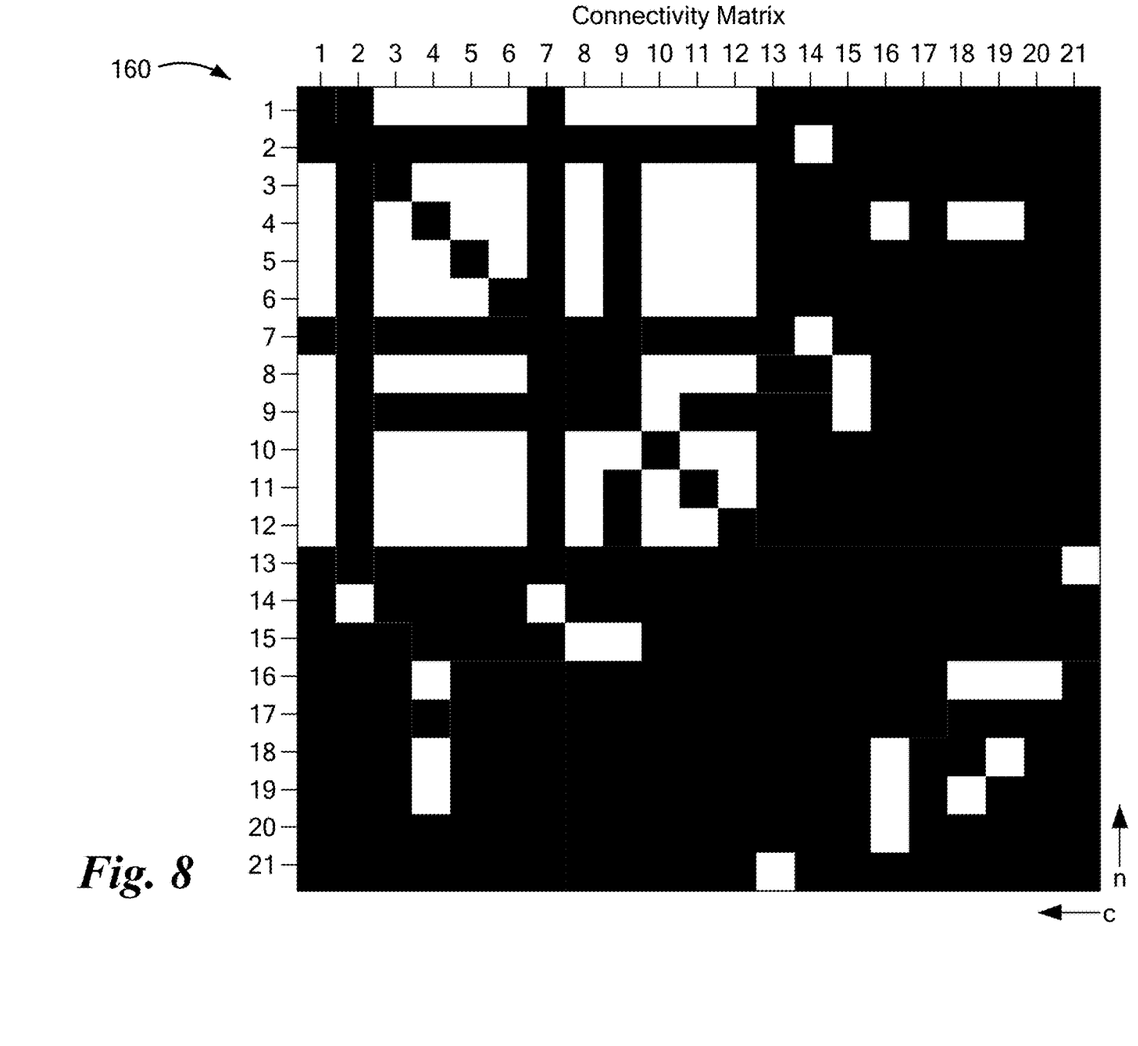
FIG. 8 shows a representation of the connections of FIG. 7.

FIG. 8 shows a representation of the connections of FIG. 7. Referring to FIGS. 7 and 8, in a particular configuration, the application identifies, for each window, a set of connected traces from the traces 180 determined to connect to the window 170; generally at least two traces will connect. The application forms a stacked plane representation of each window 170 and connected traces 180, and determines connectivity between components based on a correspondence of a location of the connected traces between a plurality of the windows. The application stores an entry indicative of a connection between the components corresponding to the windows when a connected trace from the set of connected traces from two or more windows align. FIG. 8 shows a Boolean connectivity matrix C 160 with dimensions N×N is initialized to be all false, where N is the number of components detected in the previous node (window 170) detection in FIG. 4. The application 110 maps each of the connections to a plurality of the windows 170, such that each of the mapped connections is indicative of a trace 180 between the components in the respective windows This matrix 160 stores information about whether a window 170-N is connected to another enumerated window 170-N. Like most connectivity matrices, this matrix 160 will be symmetrical along the diagonal.

These node and trace pairs are then intersected in a depth stacked sense; such that each layer represents a plane of components and attached traces. These layers are recursively compared across the list of detected nodes using 8-way connected component analysis. For a given component pair (n, c), we evaluate the first order statistics of the region, and if they match-it indicates that the components are connected. When this is true, the application 110 updates C(n, c) to be true.

Figure 9:
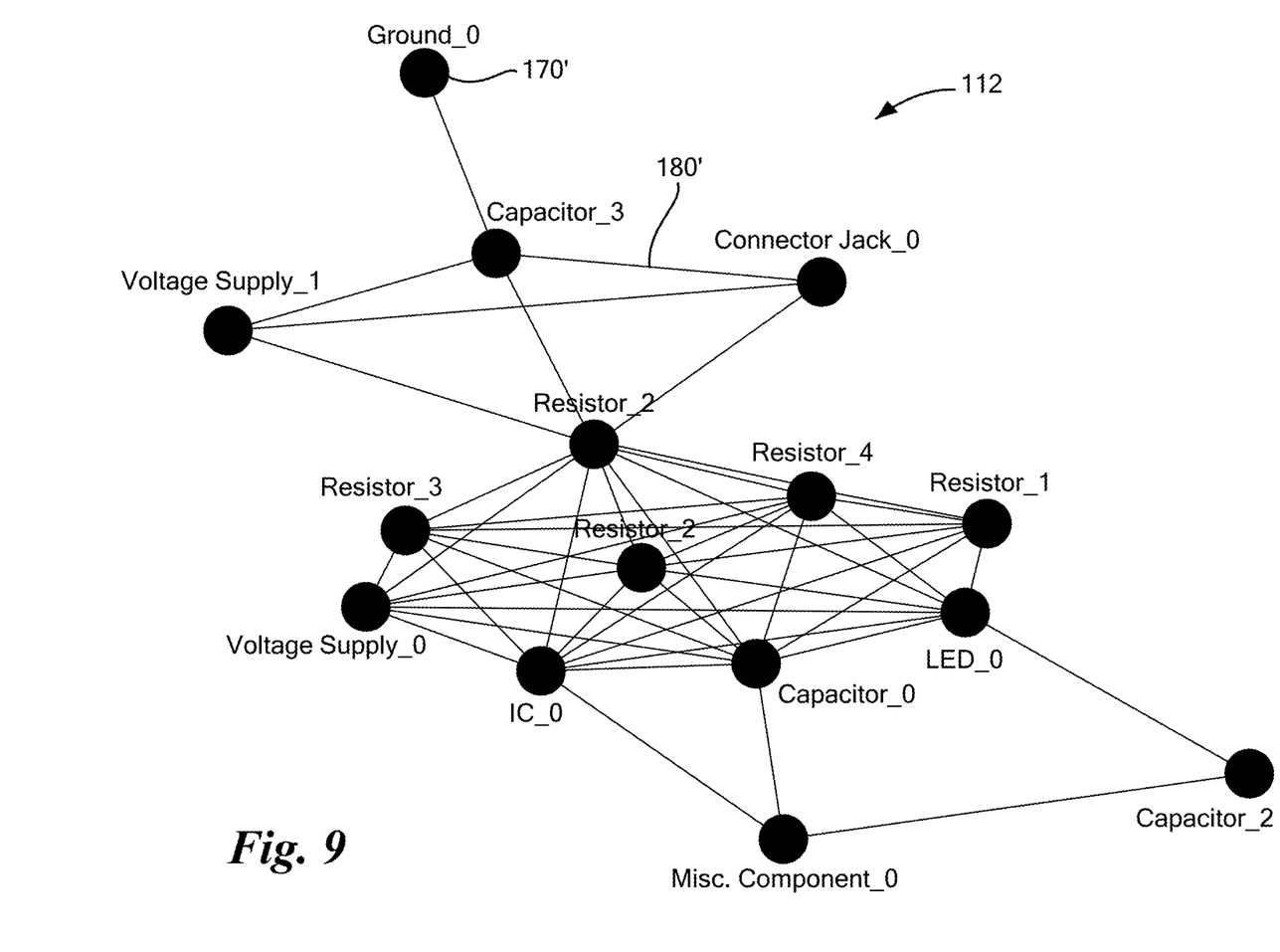
FIG. 9 shows a rendering of the computed graph resulting from coalescing the components, traces and connections from FIG. 5-7.

From the completed connectivity matrix 160, it is a straightforward matter to construct the graph 112 which represents the component 171 connectivity. The application 110 iterates over the rows and columns of the matrix simultaneously, and where the matrix is true-we instantiate an edge 180' between the two components 170'. It is important to be aware that there may be several sub-graphs which indicate separate or possibly different functionality in a schematic image, i.e. multiple independent graphs depicted on the same input image 114.

FIG. 9 shows a rendering of the computed graph resulting from coalescing the components, traces and connections from FIG. 5-7. Each of the components and corresponding window 170 defines a node 170' in the graph, and each trace 180 defines an edge 180'. Attributes including the type of individual components are stored with respect to the node 170' in a suitable data structure.

An alternate configuration may compute a directed graph, by determining, based on the component type, a polarity indicative of current flow to each respective connection, and generating a directed graph indicative of a direction of current flow on each respective connection.

A further enhancement includes recognition of crossover traces. Often unconnected crossovers, where there is no electrical communication between the intersecting traces, appear as a simple line intersection. Splices, where the traces define an electrical communication between the intersecting elements, are denoted by a dot or other enlarged indicia at the point of intersection. The application determines an intersection between a first trace and a second trace, and concludes that the intersection defines an electrical conductivity between the traces based on the enlarged indicia. The application 110 then defines the intersection as a component, as if within a window 170, and the intersecting traces 180 as connections to the defined component 171. It should be emphasized that crossover detection would occur prior to any skeletonization or other filtering that might tend to nullify the distinction of crossover features.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for analyzing a circuit representation for generating a graph of interconnected components, comprising:
    scanning a functional rendering of a circuit for identifying a plurality of windows, each window depicting a location of a respective component of a plurality of components in the circuit;
    scanning the functional rendering for identifying connections between the windows; and
    generating a graph indicative of circuit elements and traces interconnecting the circuit elements based on coalescing the plurality of windows with the identified connections, coalescing including mapping each of the connections to a plurality of the windows, each of the mapped connections indicative of a trace between the components in the respective windows, mapping the connection including:
    subtracting the windows from the functional rendering;
    identifying traces in the functional rendering;
    for each trace, computing connections based on a correspondence of a location of a window and a location of a termination of the trace, by:
    computing a path defined by a trace:
    identifying a closest window to the path, the window indicative of the corresponding component;
    traversing a plurality of directions from the path;
    determining if any of the plurality of directions connects to the window; and
    determining connectivity of the trace based on an alignment of the path with the direction connecting to the window.

2. The method of claim 1 further comprising identifying a plurality of connections, each connection extending from a first window of the plurality of windows to at least one other window of the plurality of windows.

3. The method of claim 1 wherein mapping the connection includes:
    determining an endpoint of the connection, and
    computing a distance to a nearest component from the endpoint.

4. The method of claim 1 further comprising:
    computing connectivity based on a trace continuously extending between windows; and
    storing the computed connectivity in a connectivity matrix of components based on the components located within the respective windows.

5. The method of claim 1 wherein the traversed directions include an 8-way connected component analysis from a position on the path.

6. The method of claim 1 wherein coalescing further comprises:
    determining, for each connection, a plurality of endpoints corresponding to the connection;
    determining, for each endpoint of the plurality of endpoints, a location of the endpoints of the connection; and
    computing connectivity of a connection based on a correspondence between the location of the endpoint and the location of a respective window.

7. The method of claim 1 further comprising:
    identifying, for each window, a set of connected traces from the traces determined to connect to the window;
    forming a stacked plane representation of each window and the connected traces;
    determining connectivity between components based on a correspondence of a location of the connected traces between a plurality of the windows; and
    storing an entry indicative of the connection between the components corresponding to the windows when a connected trace from the set of connected traces from two or more windows align.

8. The method of claim 1 further comprising identifying, for each of the windows, a component type indicative of the component occupying the window.

9. The method of claim 1 wherein the functional rendering includes a raster representation of an image, schematic, diagram, alphanumeric or symbolic representation of a plurality of components and at least one connection between the plurality of components.

10. The method of claim 9 wherein the function rendering is a two dimensional depiction of a PCB (printed circuit board).

11. The method of claim 8 further comprising:
determining, based on the component type, a polarity indicative of current flow to each respective connection; and
generating a directed graph indicative of a direction of current flow on each respective connection.

12. The method of claim 1 further comprising:
determining an intersection between a first trace and a second trace;
concluding that the intersection defines an electrical conductivity between the traces; and
defining the intersection as a component and the intersection traces as connections to the defined component.

13. A device for analyzing a circuit representation for generating a graph of interconnected components, comprising:
a scan interface for scanning a functional rendering of a circuit for identifying a plurality of windows each depicting a location of a respective component of a plurality of components in the circuit;
an application configured to:
identify, for each of the windows, a component type indicative of the component occupying the window;
analyze the scan of the functional rendering for identifying connections between the windows; and
generate a graph indicative of circuit elements and traces based on coalescing the plurality of windows with the identified connections, coalescing including mapping each of the connections to a plurality of the windows, each of the mapped connections indicative of a trace between the components in the respective windows, the application further configured to:
subtract the windows from the functional rendering;
identify traces in the functional rendering;
for each trace, compute connections based on a correspondence of a location of a window and a location of a termination of the trace, by:
compute a path defined by a trace;
identify a closest window to the path, the window indicative of the corresponding component;
traverse a plurality of directions from the path;
determine if any of the plurality of directions connects to the window; and
determine connectivity of the trace based on an alignment of the path with the direction connecting to the window; an
a rendering device for displaying the generated graph. d 14. The device of claim 13, wherein the application is further configured to identify a plurality of connections, each connection extending from a first window of the plurality of windows to at least one other window of the plurality of windows.

15. The device of claim 13, further comprising a connectivity matrix for storing the identified connections between the components based on the components located within the respective windows.

16. A computer program embodying program code on a non-transitory computer readable storage medium that, when executed by a processor, performs steps for implementing a method for analyzing a circuit representation for generating a graph of interconnected components, the method comprising:
scanning a functional rendering of a circuit for identifying a plurality of windows, each window depicting a location of a respective component of a plurality of components in the circuit;
scanning the functional rendering for identifying connections between the windows; and
generating a graph indicative of circuit elements and traces interconnecting the circuit elements based on coalescing the plurality of windows with the identified connections, coalescing including mapping each of the connections to a plurality of the windows, each of the mapped connections indicative of a trace between the components in the respective windows, mapping the connection further including:
subtracting the windows from the functional rendering;
identifying traces in the functional rendering;
for each trace, computing connections based on a correspondence of a location of a window and a location of a termination of the trace, by:
computing a path defined by a trace;
identifying a closest window to the path, the window indicative of the corresponding component;
traversing a plurality of directions from the path;
determining if any of the plurality of directions connects to the window; and
determining connectivity of the trace based on an alignment of the path with the direction connecting to the window.

* * * * *